United States Patent [19]
Uchida et al.

[11] Patent Number: 5,537,636
[45] Date of Patent: Jul. 16, 1996

[54] FILE MANAGEMENT SYSTEM FOR A PARTIALLY REWRITABLE STORAGE MEDIUM WHERE FILE MANAGEMENT INFORMATION IS CREATED IN A REWRITABLE ZONE BASED ON MEDIUM MANAGEMENT INFORMATION IN A READ ONLY ZONE

[75] Inventors: Yoshiaki Uchida; Kenichi Utsumi; Masahiro Nakada, all of Kawasaki, Japan

[73] Assignee: Fujitsu Limited, Japan

[21] Appl. No.: 411,066

[22] Filed: Mar. 27, 1995

Related U.S. Application Data

[63] Continuation of Ser. No. 780,122, Oct. 21, 1991, abandoned.

[30] Foreign Application Priority Data

Oct. 20, 1990 [JP] Japan .................... 2-282617

[51] Int. Cl.⁶ .................................................. G06F 15/40
[52] U.S. Cl. .................... 395/600; 395/439; 364/DIG. 2; 364/915; 364/965.5; 364/965.8; 364/962; 364/962.4; 364/952; 364/952.31; 369/59
[58] Field of Search .................... 395/700, 600, 395/404, 439, 497.01, 497.03; 369/47, 48, 59; 360/48, 49

[56] References Cited

U.S. PATENT DOCUMENTS

| | | | |
|---|---|---|---|
| 4,791,623 | 12/1988 | Deiotte | 369/59 |
| 4,792,937 | 12/1988 | Picard | 369/59 |
| 4,947,367 | 8/1990 | Chang et al. | 364/900 |
| 5,029,125 | 7/1991 | Sciupac | 364/900 |
| 5,040,110 | 8/1991 | Miki et al. | 364/200 |
| 5,073,887 | 12/1991 | Takayi et al. | 369/100 |
| 5,107,481 | 4/1992 | Miki et al. | 369/59 |
| 5,173,886 | 12/1992 | Satoh et al. | 369/32 |
| 5,214,627 | 5/1993 | Nakashima et al. | 369/32 |
| 5,218,685 | 6/1993 | Jones | 395/425 |
| 5,233,576 | 8/1993 | Curtis et al. | 369/13 |
| 5,247,494 | 9/1993 | Ohno et al. | 369/13 |
| 5,265,230 | 11/1993 | Saldanha et al. | 395/425 |

FOREIGN PATENT DOCUMENTS

| | | |
|---|---|---|
| 0294489 | 12/1988 | European Pat. Off. |
| 032840 | 8/1989 | European Pat. Off. |

*Primary Examiner*—Kevin A. Kriess
*Attorney, Agent, or Firm*—Staas & Halsey

[57] ABSTRACT

A file management system for a partially rewritable single storage medium increases a Rewritable Zone and an unrewritable Read Only Zone, where a desired number of files and pieces of medium management information, including management information for respective files, are written when the Read Only Zone is manufactured. The file management system comprises a reading device and a creating device. The reading device reads the medium management information written in the Read Only Zone upon commencing the use of the storage medium. The creating device creates, in the Rewritable Zone, file management information necessary for using the storage medium based on the medium management information read from the reading device, according to the usage status of the storage medium.

32 Claims, 9 Drawing Sheets

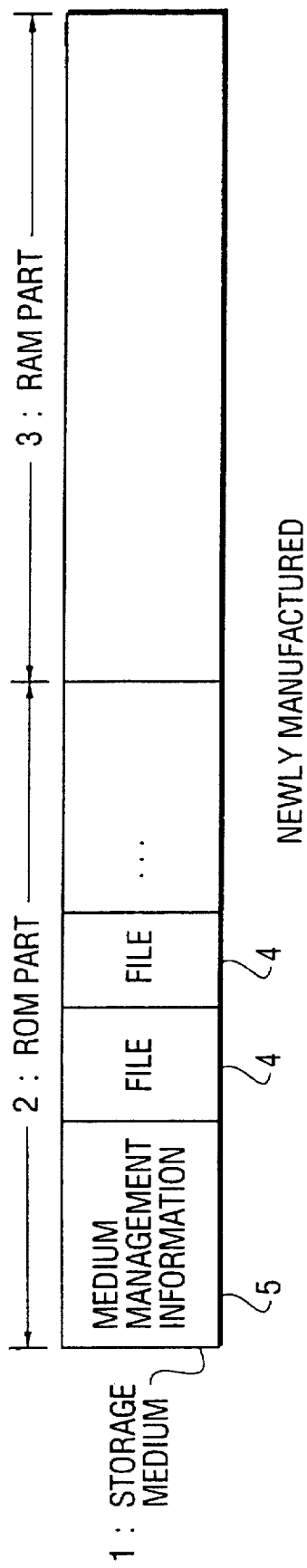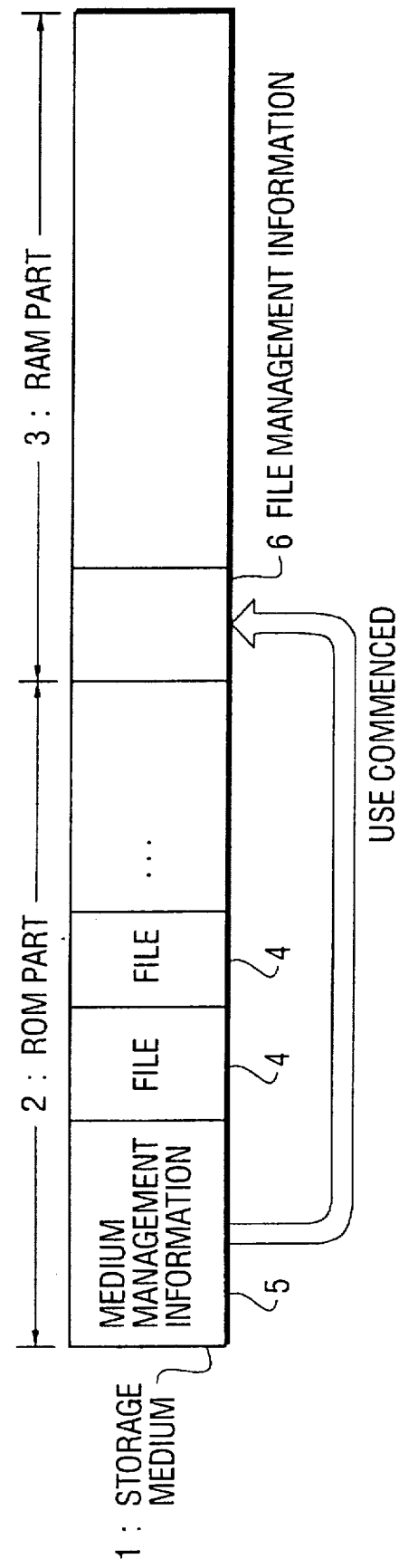

FILE MANAGEMENT SYSTEM FOR A PARTIALLY REWRITABLE STORAGE MEDIUM WHERE FILE MANAGEMENT INFORMATION IS CREATED IN A REWRITABLE ZONE BASED ON MEDIUM MANAGEMENT INFORMATION IN A READ ONLY ZONE

This application is a continuation of application Ser. No. 07/780,122, filed Oct. 21, 1991, now abandoned.

BACKGROUND OF THE INVENTION

This invention relates to a file management system for a storage medium in which a rewritable region and an unrewritable region exist in the same media.

DESCRIPTION OF THE RELATED ART

Conventional randomly accessible storage media are classified into a storage media (such as magnetic disks and opto-magnetic disks) capable of rewriting data in the entire region and those (such as one-time-only writable optical disks and CD-ROMs) incapable of rewriting data in an entire region.

Therefore, a conventional file management system for randomly accessible storage media is premised as being capable of either rewriting data in the entire region or reading data from the entire region but incapable of rewriting data in the entire region.

The basic principle of file management is to create file management information for respective files in the file storing media themselves.

This is because the structure of the management system would otherwise be complex. This makes the management task cumbersome and prevents efficient file management. This in turn delays the access to a file thus reducing, the speed of processing data in the file.

In a rewritable file, the file management information must necessarily be rewritable. That is, each time a file is updated, deleted or renamed, the file management information needs to be rewritten.

Since rewritable storage media can satisfy these two conditions, they can manage files efficiently.

On the other hand, unrewritable storage media adopt a file management system similar to that for rewritable storage media.

That is, the file management information for files created in the unrewritable storage media is created in the unrewritable storage media.

A file created in an unrewritable storage medium can only read data and cannot update or delete data. Thus, the content of the file management information need not be changed. However, if the file management information is rewritten, the unrewritable storage medium cannot read data. Therefore, an unrewritable storage medium had better create the file management information in the same storage medium as the one storing the file. This expedites an access to a file.

Recent advances in manufacturing techniques have realized storage media such as opto-magnetic disks. An unrewritable region where data are pre-written during manufacturing can be set in any desired part of these media. These data may be predetermined data, such as on programs, characters or graphics, thus reducing the unit data writing cost incurred during the manufacturing process. Such a storage medium comprises a rewritable region and an unrewritable region.

When a conventional file management system is adopted for such a storage medium without modification, the system must control the storage medium either in its entirety or by dividing it into an unrewritable region (hereafter referred to as a Read Only Zone) and a rewritable region (hereafter referred to as a Rewritable Zone).

However, these two (2) file management systems are not without their problems, as described below.

ROM/RAM Individual Management System

[1] A physically single storage medium must be managed as logically plural storage media. This makes it difficult to optimize the file access by an (OS) operating system. For instance, although an OS identifies a disk by a drive name, this system requires different drive names to be assigned to the Read Only Zone and the Rewritable Zone. Thus, for optimally controlling an access head (for a magnetic disk) or an optical pick-up (for an optical disk), management of the Read Only Zone and the Rewritable Zone as separate storage media causes the actual movement of an access head (or an optical pick-up) by a device driver control to contradict with the state in which the device is controlled by the OS, thus preventing the intended control. The same problem occurs not only with the OS but also with an application program.

[2] The file management information written in the Read Only Zone must necessarily assume a certain file management system. Accordingly, only a certain OS can manipulate the file created in the Read Only Zone.

[3] Since the ratio of the Read Only Zone to the Rewritable Zone as well as their structures is storage medium specific, file processing becomes complicated when a user creates application software.

ROM/RAM Unitary Management System With Management Information in the Read Only Zone Such a system assumes the management of both the Rewritable Zone and the Read Only Zone as a single storage medium by storing management information in the Rewritable Zone.

The storage medium management information must be created in the Rewritable Zone, because the file management information created in the Rewritable Zone needs to be updated each time a file is updated, deleted or renamed. Consequently, the file management information created in the Read Only Zone must also be created in the Rewritable Zone, duly enabling a file in the Read Only Zone to be deleted. However, this also enables file management information regarding the Read Only Zone created in the Rewritable Zone to be rewritten and erasable. Thus, when file management information in the Read Only Zone is erased accidentally, it becomes impossible to access the files in the Read Only Zone.

Also, a conventional file management system ordinarily releases the region used by a file on a storage medium and makes it a usable region, (which can be used by some other files) when the file is deleted.

However, such a conventional file management system has the following problems, if it is applied to a file management for a storage medium having both a Read Only Zone and a Rewritable Zone when a file in the Read Only Zone or its partial region is released.

For instance, a new file creation or a file data writing request can cause a data writing request to a released region in the Read Only Zone. If this occurs, when data are written according to the writing request, the data writing request causes an error in most cases, except when the written data are the data already written in the region to which the data to be written are written.

That is, since the data writing to the Read Only Zone is impossible, a verification performed after the data writing produces a writing error in many cases. When a verification is not performed, since no error is notified to the application software side to which the data writing request is made, despite the fact that the no data are actually written. This causes a major problem, because the application software side performs the subsequent processes by assuming that the data are properly written. When such a verification is performed, since a data writing error occurs frequently, the system experiences a severe performance deterioration such as a throughput reduction. To avoid it, some file management systems put their storage media themselves out of use. This is because the verification is performed by reading the written data out of the storage medium to which the data are written, the process time tends to increase. If each verification causes an error, the system throughput is lowered significantly.

SUMMARY OF THE INVENTION

This invention is made with the above background and aims at enabling a semi-conventional unitary file management system for a storage medium to manage files created both in the unrewritable Read Only Zone and in the Rewritable Zone without having to use a special file management system.

This invention is applicable to a file management system for a single storage medium, comprising a Rewritable Zone and an unrewritable Read Only Zone, to which a desired number of files and pieces of management information, including those of medium management information for respective files, are written when it is manufactured.

The elements of this invention are as follows:

A reading means read the medium management information written in the Read Only Zone when the storage medium is used initially.

A creating means creates in the Rewritable Zone file management information necessary in using the storage medium from the storage medium management information read from the reading means, according to the status of using the storage medium.

A data writing means for judging the normality of data requested to be written can be further included. The data writing means judges whether or not the data requested to be written into a predetermined region of the Read Only Zone are the same as the data already written in the predetermined region of the Read Only Zone.

The data writing means can also perform the following processings:

The data writing means searches the Read Only Zone for the existence of a region where the same data as those to be written are already written and considers the data writing as normal, when the Read Only Zone requests a data writing to a predetermined region and if the data requested to be written are not the same as the data already written in the predetermined region.

The data writing means can also limit, to a predetermined number of times, the number of times by which data are read from a region for reducing an overhead, when the region is searched to determine whether or not the same data are written therein as the data requested to be written.

Also, a region supervising means can be further used. The region supervising means examines the control data for a region to be managed in the region management information within the Read Only Zone in managing the region management information in the file management information created in the Rewritable Zone at a predetermined timing. When the region to be managed is assigned as a usable region, the control data for the region are updated so that the region is made an unusable region.

BRIEF DESCRIPTION OF THE DRAWINGS

FIGS. 1A through 1D are block diagrams designating a principle of this invention;

DESCRIPTION OF THE PREFERRED EMBODIMENTS

FIGS. 1A through 1D are block diagrams designating a principle of this invention.

In FIGS. 1A through 1D, a file management system for a partially rewritable storage medium 1 comprising a Rewritable Zone 3 and a unrewritable Read Only Zone 2 on a single storage medium.

Claim 1 of this invention structures a file management system comprising a reading means and a creating means as follows:

As shown in FIG. 1A, when the storage medium 1 is created, one or more than one file 4 and medium management information 5 including the management information about the file 4 are pre-written in the Read Only Zone 2. When the storage medium 1 begins to be used, file management information 6 necessary for using the storage medium 1 is created in the Rewritable Zone 3, based on the medium management information 5 created in the Read Only Zone 2 in accordance with the usage type of the storage medium 1, as shown in FIG. 1B.

The medium management information 5 stores the information on the initial state of the storage medium 1 when it is newly manufactured, such as follows:

(1) The correspondence between regions of the storage medium 1 and the Read Only Zone 2 and the Rewritable Zone 3.

(2) The unusable region on the storage medium 1, if any.

(3) The type and position of a file written in the Read Only Zone 2.

As described above, since the file management information 6 for managing files in the Read Only Zone 2 is created in the Rewritable Zone 3, updation of the file management information 6 according to the new files created in the Rewritable Zone 3 allows the file management information 6 to manage all the files created in the Read Only Zone 2 and the Rewritable Zone 3.

Consequently, the file management information 6 created in the Rewritable Zone 3 enables the storage medium 1 to be managed as a single medium. Also, by creating more than one file 4 corresponding to plural kinds of systems in the Read Only Zone 2, a plurality of different file management systems can be structured in the storage medium 1. Since the file 4 and medium management information 5 created in the Read Only Zone 2 cannot be erased, even if all the file management information 6 created in the Rewritable Zone 3 is accidentally erased, the file management system can be restructured from the entire file 4 and the medium management information 5 created in the Read Only Zone 2.

Figure 1C:
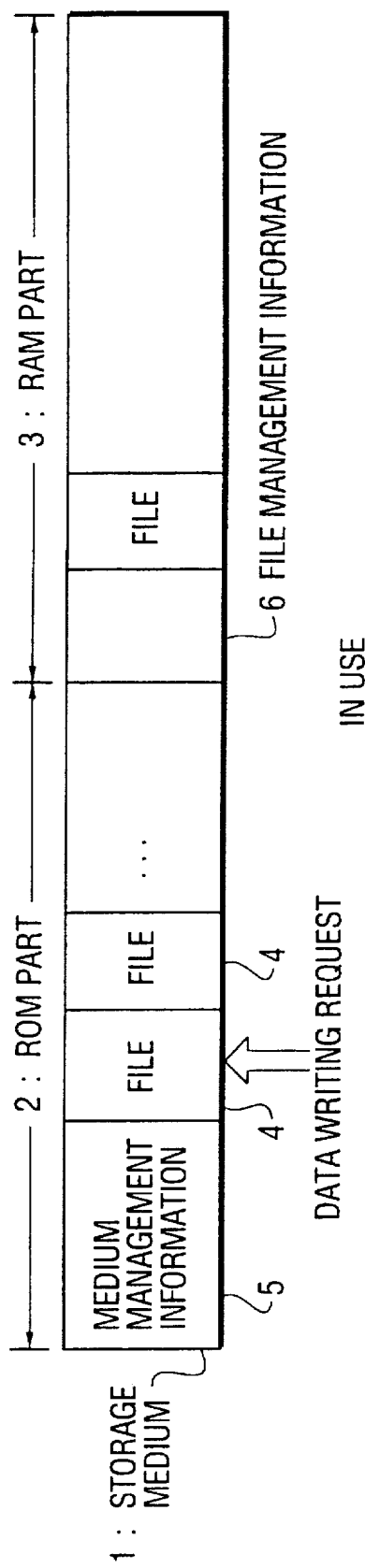

As shown in FIG. 1C, when a request is made to write data in a predetermined region in the Read Only Zone 2, if the data to be written are the same as the data pre-written in the predetermined region of the Read Only Zone 2, the data writing is considered as normally succeeded.

If the data requested to be written to the predetermined region in the Read Only Zone 2 are different from the data already written, the data writing request is considered as an error.

Meanwhile, when there is a request to write data to a predetermined region, even if the data to be written do not match the data written in the predetermined region in the Read Only Zone 2, the data writing request is not automatically considered as an error and the following processing can be performed.

That is, if a search of other regions in the Read Only Zone 2 reveals that the same data as those to be written are written in an existing region and that the region is set to an "usable" (for a new file or as a vacant area) state, the file management information 6 is updated such that the region is managed as a region of a file to which the data writing request is made.

This enables a region in the Read Only Zone 2 to be used effectively as a region of a newly created file.

A mere change of a part of a conventional file management system allows the above processing.

Figure 1D:
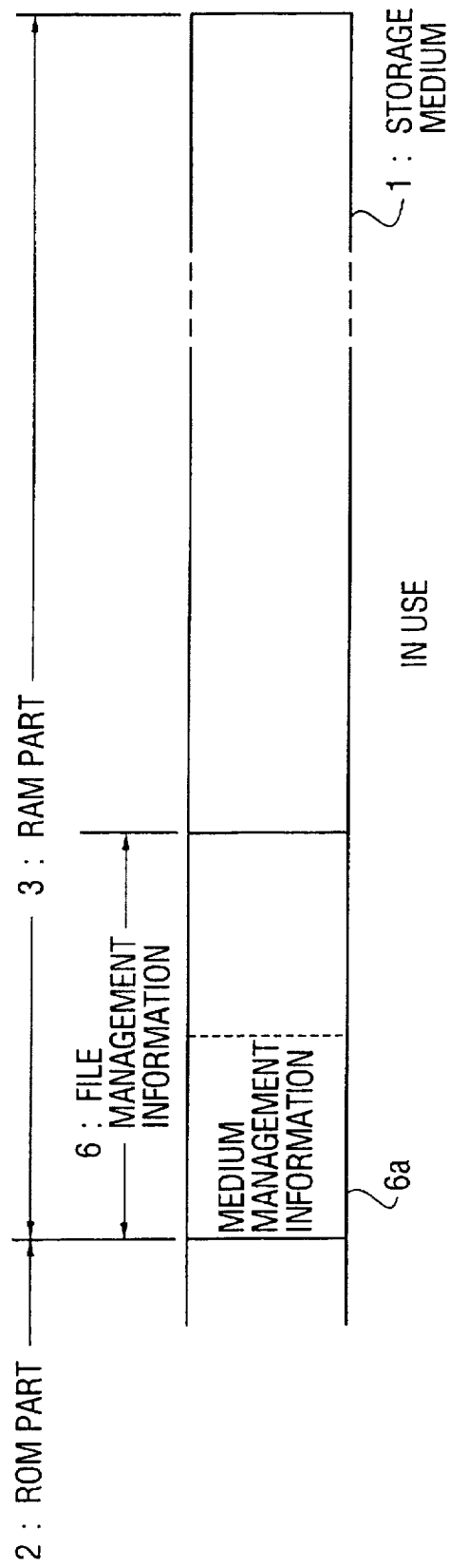

Claim 3 of this invention further structures claim 1 or 2 of this invention as follows:

As shown in FIG. 1D, when the management information assigns a controlled region as a usable region, region management information 6a (e.g. a file allocation table) in file management information 6 created in the Rewritable Zone 3 causes a region to be controlled by control data in the region management information 6a stored in the Read Only Zone 2 to be updated to an unusable region, by examining the controlled region at a predetermined timing such as upon an access to the region management information 6a or upon a generation of a writing request to the Read Only Zone 2.

Because such processing causes the region management information 6a to sequentially register plural control target regions in the Read Only Zone 2 to be managed as "unusable" regions, an unnecessary access to the storage medium 1 in response to an writing request to the Read Only Zone 2 and the access to the storage medium 1 is made more efficiently. In other words, only an access to a usable region in the RAM part 3 is efficiently granted.

The region to be controlled by the region management information is a minimum unit of assigning a region to a file. It comprises e.g. a sector having a predetermined byte lengths or a cluster composed of plural sectors.

Figure 2A:
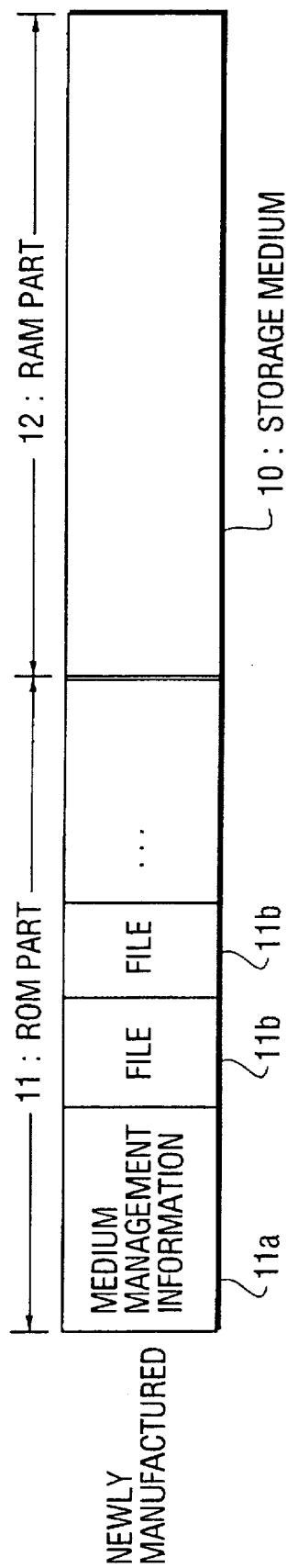
FIGS. 2A through 2C illustrate an outline of this invention.

Preferred embodiments of this invention are explained by referring to attached drawings:

FIG. 2A schematically shows the initial configuration of a storage medium 10 used in the embodiments of this invention. The storage medium 10 is an opto-magnetic disk, for example.

The storage medium 10 comprises a Read Only Zone 11 capable only of reading data and incapable of rewriting data, and a Rewritable Zone 12 capable of both reading and rewriting data.

The Read Only Zone 11 pre-records the medium management information 11a composed of the three (3) elements described below.

[1] Information on segmenting respective regions of the Read Only Zone 11 and the Rewritable Zone 12 in the storage medium 10.

[2] Information on the unusable region in the storage medium 10.

[3] Management information on one (1) or more than one (1) file 11b recorded in the Read Only Zone 11.

A method for using the storage medium 10 is described, next.

Figure 2B:
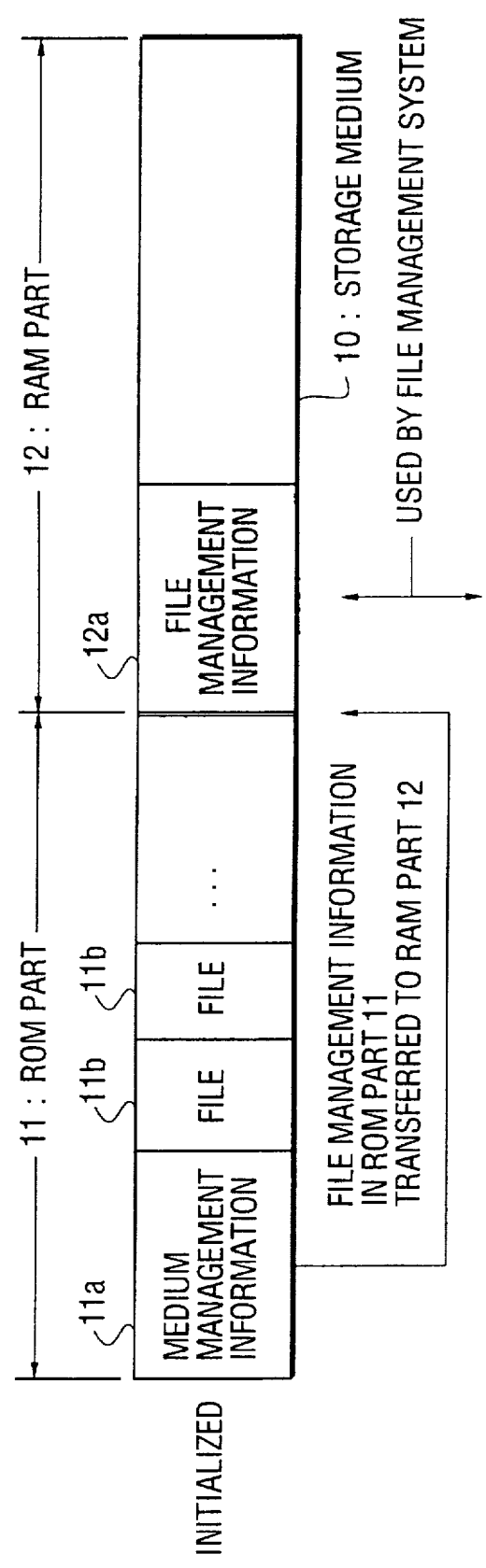

Before the storage medium 10 is used, based on the medium management information 11a written in the Read Only Zone 11, the file management information 12a is created in the Rewritable Zone 12. As shown in FIG. 2B, the file management information 11a is in a format corresponding to the system (classified by the combination of OS and equipment model) using the storage medium 10 or the OS file management system. The creation process corresponds to a conventional formatting process for an erasable disk medium (initialization of a storage medium). Thereafter, the file management system performs a series of filing operations by using the file management information 12a, such as managing the files newly created in the Rewritable Zone 12 of the storage medium 10 and those deleted from the Read Only Zone 11.

The file management information 12a comprises a directory for hierarchically controlling all files managed by medium management information such as the file management system and a file allocation table for storing the usage statuses of all sectors in the storage medium 10.

After formatting the storage medium 10 as described above, it becomes possible to use it. When a desired region in the Read Only Zone 11 is released e.g. by a file deletion in a file management process, the released region in the Read Only Zone 11 is managed as an unusable region. Each region whose usage is managed as above is a cluster comprising a sector or a plurality of sectors.

Figure 2C:
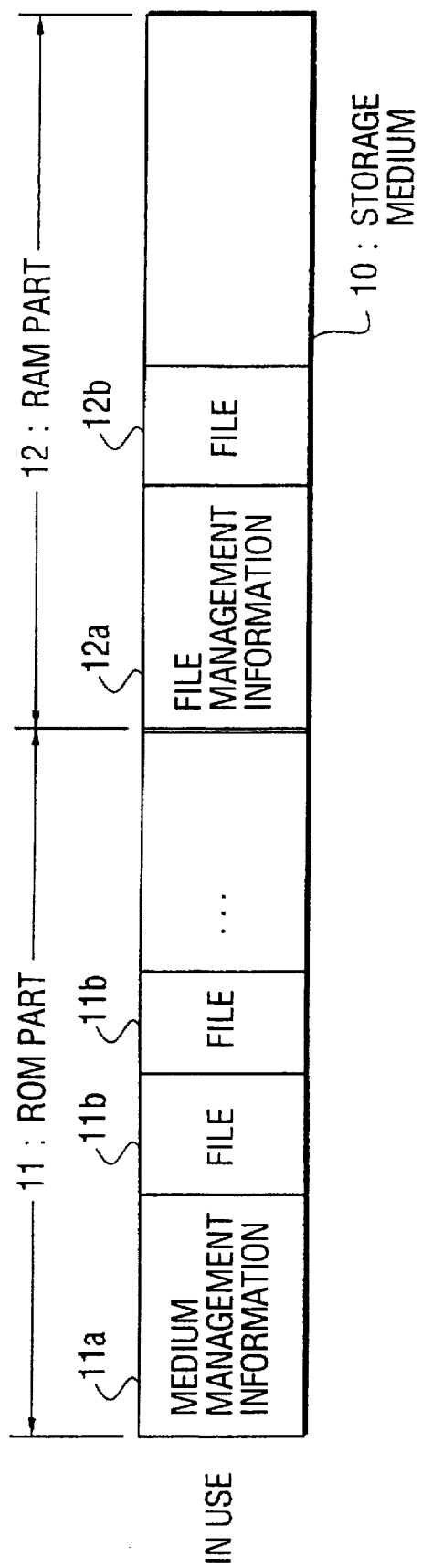

To summarize, the medium management information 11a is created in the Read Only Zone 11 when the storage medium 10 is manufactured. Based on the medium management information 11a, the file management information 12a is created in the Rewritable Zone 12 according to the medium usage form (file management system) based on the file management information 12a, as shown in FIG. 2C.

Several embodiments of file management by using the storage medium 10 are explained, next.

The below explanation assumes the following physical characteristics of the storage medium 10:

Track number: 10,000 through 20,000

Sector number: 25 sectors/track

Sector length: 512 bytes/sector

Total capacity: 120 through 250 Mega bytes

Also, whether or not the region permits writing can be set in track units.

First Embodiment

A first embodiment shows an example in which file management information is recorded for respective anticipated plural systems in the Read Only Zone 11 of the single storage medium 10. The systems are classified by combination of an OS and a computer model (or simply referred to as a model).

In this case, the information as shown in Table 1 below is written in the Read Only Zone 11 on manufacture of the storage medium 10.

TABLE 1

TRACK 0
Sector 1
bytes 1–8: format identification
bytes 9–16: empty
bytes 17–32: format information of storage medium 10
bytes 33–48: name (or ID) of target system 1
bytes 49–64: position in Read Only Zone 11 where the management information for target system 1 is written
bytes 65–80: name (or ID) of target system 2
bytes 81–96: position in Read Only Zone 11 where the management information for target system 2 is written
bytes 97–112: name (or ID) of target system 3
bytes 113–128: position in Read Only Zone 11 where the management information for target system 3 is written
....continue until target system 14....
Sector 2
User definition
Sectors 3–8
Bit maps showing whether respective tracks belong to the Read Only Zone 11 or the Rewritable Zone 12
Sectors 9–12
IPL records for target system 1
Sectors 13–24
IPL records for target system 2
TRACKS 1 through 6
Management information for target systems 1 and 2
TRACKS 7 through 12
Management information for target system 3
....plural files 11b to continue....

That is, bytes 1–8 in sector 1 of TRACK 0 store format identification, which is an ID label for identifying the data format system for the storage medium 10.
Following bytes 9–16 are empty.
Next bytes 17–32 store the format information showing the recording format of the storage medium 10.

The format information structure of the storage medium 10 is shown in Table 2 below.

TABLE 2

(TRACK 0, Sector 1 only)
bytes 17–18: the total cylinder number
byte 19: side number
byte 20: sectors/track number
bytes 21–22: sector length
bytes 23–24: alternate track number
bytes 25–26: track number in the Rewritable Zone 12 to which file management information 12a for storage medium 10 is written
bytes 27–32: undefined That is, bytes 17 and 18 in sector 1 of track 0 record the total cylinder number of the storage medium 10.

Byte 19 records the number of data recording sides (disk sides) of the storage medium 10.

Byte 20 records the number of sectors per track.

Bytes 21 and 22 record the sector length showing the byte number (byte length) of a sector.

Bytes 23 and 24 record the number of alternate tracks (alternative tracks) on which data are written in lieu of on the sectors (defective sectors) failing to restore data e.g. on account of a defect on a recording side.

Bytes 25 and 26 record the information on the first track (ordinarily, the head end track of the Rewritable Zone 12) to which the file management information 12a of the storage medium 10 is first written.

Also, bytes 33 through 48 in sector 1 of track 0 record the name (or ID) of target system 1.

Bytes 49 through 64 record the information on the position of the storage region in the medium management information 11a of the Read Only Zone 11 where the management information for target system 1 is written.

The information on the position comprises an initial track, a track number, a boot track sector position, a boot sector number, and a load address. That is, the initial track and track number indicate the region for writing the above position information in the medium management information 11a of the Read Only Zone 11 (area for storing information on position). The boot track sector position indicates the track and sector position which stores an IPL (initial program loader) record fed by the boot strap loader to the main memory device when the system is booted up. The load address indicates the head end address of the main memory for loading the IPL record, which is a program for loading the central core of an operating system and a system program to a predetermined region of a main memory device.

Thus, thirty-two (32) bytes of information are recorded for a target system. As with the 32-byte information for target system 1, each 32-byte information for target system 2 and all target systems thereafter is stored in byte 65 and thereafter in sector 1 of track 0.

Here, the name (or ID) of the above target system is set by the combination of the OS and the equipment model on which the OS runs. When the same OS is used for different models, since the management information for other target systems using the OS can be commonly used as the management information for the target system, the boot track sector position need only be set in a different position.

Then, sector 2 of track 0 records various pieces of information defined by the manufacturer.

Sectors 3 through 8 of track 0 record the bit maps indicating whether respective tracks of the storage medium 10 belong to Read Only Zone 11 or the Rewritable Zone 12. That is, they record bit-by-bit the information for each and every track in the storage medium 10, whether it belongs to the Read Only Zone 11 (e.g. having bit value "0") or the Rewritable Zone 12 (e.g. having bit value "1").

Sectors 9 through 12 of track 0 store the IPL record for target system 1, and sectors 13 through 24 store the IPL record for target system 2.

Further, tracks 1 through 6 store management information for target systems 1 and 2, and tracks 7 through 12 store management information for target system 3. Track 13 and thereafter store the management information for target system 4 and thereafter, as well as the content of a plurality of files 11b storing plural programs forming various OSs.

Explained next are various usage methods, such as for booting up the system using the storage medium 10 configured above.

As described above, since the Read Only Zone 11 of the storage medium 10 pre-records the files storing plural programs forming various OSs used by plural systems, the user can boot up the system of various models having a desired OS by specifying a desired target system according to the combination of the OS and the model to be used.

Figure 3:
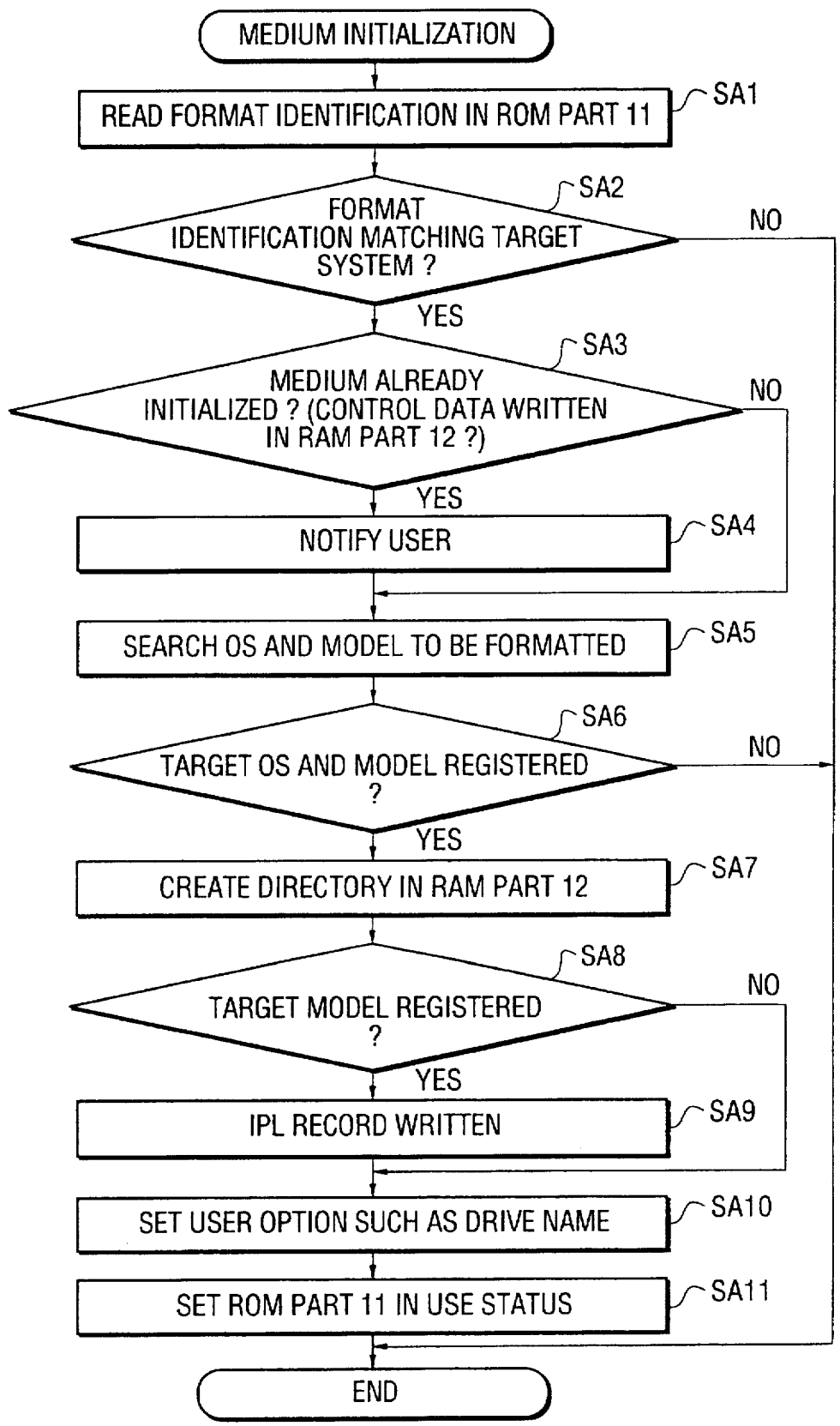
FIG. 3 is a flowchart for explaining the initialization of a storage medium in a first embodiment of this invention.

FIG. 3 is a flowchart for explaining the operation of initializing the storage medium 10 by a desired computer model using a desired OS.

(SA1) Sector 1 of track 0 in the Read Only Zone 11 is read out first, and then the format identification recorded in bytes 1 through 8 in read-out sector 1 is read out second.

(SA2) It is judged from the format identification whether or not the format system of the storage medium 10 is usable by the computer. If it is judged to be an unusable system, the process immediately stops. If it is judged to be usable, the process proceeds to SA3.

(SA3) It is further judged whether or not the storage device 10 is already initialized. The judgment is made by detecting whether or not the file management information 12a is pre-created in the Rewritable Zone 12. If it is judged that the storage medium 10 is already initialized the process moves to SA4, and if not the process skips SA4 and goes on to SA5.

(SA4) When the user specifies the initialization of the storage medium 10 again, the file management information 12a pre-created in the Rewritable Zone 12 is read-out and the content is displayed e.g. on a CRT, thereby notifying the user.

(SA5) After completing process SA4, or when the memory medium 10 is not detected to be initialized in process SA3, a search is made to determine whether the name (or ID) of the target system (the combination of OS and model) to be initialized next is registered in byte 33 and thereafter in sector 1 of track 0.

(SA6) When no name (or ID) matching the combination of OS and model is detected in the search, a target system having the same OS is searched. If the target system is registered the process moves to process SA7, and if not the process ends.

(SA7) After reading the management information of the specified system from the corresponding region in the Read Only Zone 11, based on the initial track and the track number of the position information recording the management information of the target system, the read management information is written in the head end region of the Rewritable Zone 12, thereby creating the file management information 12a (e.g. a directory) in the head end region of the Rewritable Zone 12. Also at this time, the load address of the IPL record recorded in the position information (Refer to Table 1.) is written into the file management information 12a.

(SA8) Upon completion of process SA7, it is judged whether or not the object model in process SA5 is found, i.e. whether or not the object model is registered in the Read Only Zone 11. If it is judged so the process continues to process SA9, and if not the process skips SA9 and goes on to SA10. (SA9) By referring to the boot track sector position and boot sector number in the management information for the object model, which are in the management information for the target system written in the Read Only Zone 11 and read out in process SA7, the IPL record corresponding to the object model is read from the corresponding sector of the corresponding track and written into the predetermined region in the Rewritable Zone 12.

(SA10) The information on user definition recorded in sector 2 of track 0 of the Read Only Zone 11, the management information specified as a user option is set in the file management information 12a.

(SA11) The file allocation table, which forms a part of the file management information 12a indicating the usage status of respective sectors in the storage medium 10 is set such that all the sectors in the Read Only Zone 12 are in use.

Here, if it is determined in process SA8 that the Read Only Zone 11 registers only the object OS and does not register the object model, the IPL record is not written into the Rewritable Zone 12 in process SA9. Thus, only processes SA10 and SA11 are performed. That is, because the IPL record depends on the model, the IPL record is not written into the Rewritable Zone 12 when only the OS is registered and the object model is not registered.

When neither the target system (the appropriate combination of the OS and model) nor the OS exists in process SA6 the process ends immediately, because the storage medium 10 cannot possibly boot up the system.

Thus, when the storage medium 10 is manufactured, the programs (files) used by plural target systems (specified by the combinations of models and OSs), the IPL records, and pieces of management information for all the programs (files) used by the OSs of the plural target systems all for respective systems are written in the Read Only Zone 11. When the storage medium 10 is initialized, on specification of the particular target system by a combination of model and OS, the file management information 12a (such as directory and file allocation table) necessary for managing all the programs (files) required by the target system is automatically created in the Rewritable Zone 12.

When a target system (specified by a combination of model and OS) is pre-registered in the Read Only Zone 11, the IPL record of the target system stored in the Read Only Zone 11 is also written in the predetermined region of the Rewritable Zone 12. Here, when only the OS of the target system is pre-registered in the Read Only Zone 11, only the file management information 12a is created in the Rewritable Zone 12 and no IPL record is written in it.

Initialization of the storage medium 10 in this manner enables it to boot up plural target systems recorded in the Read Only Zone 11.

Figure 4:
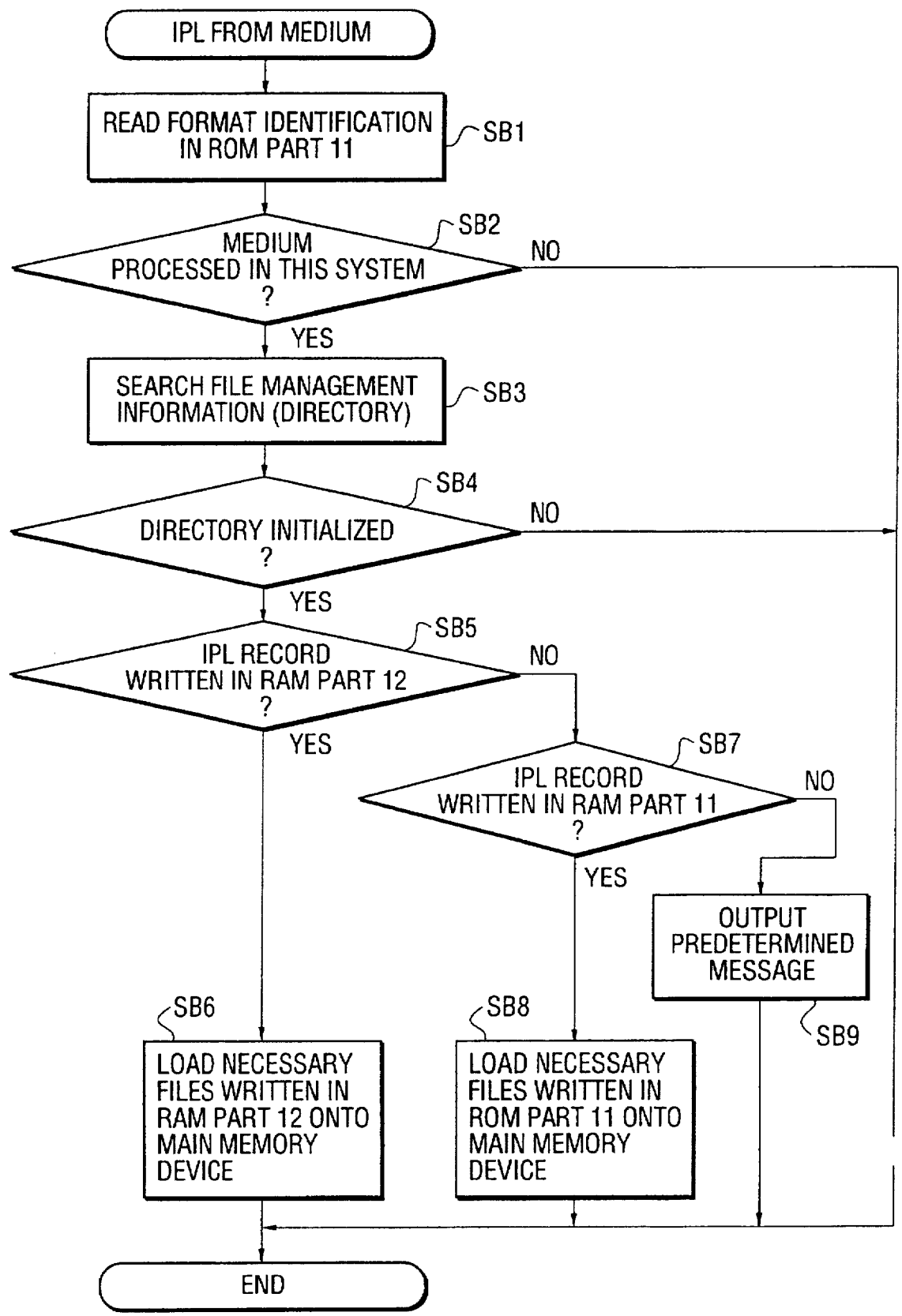
FIG. 4 is a flowchart for explaining the IPL processing from the storage medium in the first embodiment of this invention.

FIG. 4 is a flowchart for explaining the IPL processing steps of the storage medium 10.

More specifically, FIG. 4 explains the process of booting, in the main memory device, the IPL record corresponding to the target system for which the file management information 12a is created in the Rewritable Zone 12 of the storage medium 10 initialized as above.

After sector 1 in track 0 is read from the Read Only Zone 11 in the storage medium 10, the process starts.

(SB1) The format identification written in sector 1 is read.

(SB2) It is judged whether or not the storage medium 10 has a processable format. If the judgment is affirmative the process continues to step SB3 and, if negative the process terminates.

(SB3) The file management information 12a (directory) is searched in the Rewritable Zone 12.

(SB4) It is judged whether or not the directory is initialized. If the judgment is affirmative the process continues to step SB5, and if negative the process terminates.

(SB5) It is judged from the directory whether or not the IPL record is written in a predetermined region of the Rewritable Zone 12. If the judgment is affirmative the process continues to step SB6, and if not it branches to step SB7.

(SB6) A boot strap loader loads the IPL record written in the Rewritable Zone 12 on a predetermined region of the main memory device designated by the load address written in the file management information 12a. Further, by using the loaded IPL record, all the files (such as system programs) written in the Read Only Zone 11 and registered in the file management information 12a (directory) are loaded on a predetermined region in the main memory device. Upon completion of step SB6, the process terminates.

(SB7) It is judged whether or not a pointer to an IPL record in the Read Only Zone 11 used in the system is written in the position information (Refer to table 1.) of the management information for the target system written in sector 1, of track 0 in the Read Only Zone 11. If the judgment is affirmative the process continues to step SB8, and if negative the process jumps to step SB9.

(SB8) The pointer to the IPL record (boot track/sector position) in the Read Only Zone 11 to be used in the target system is obtained, from position information (shown in Table 1) of the management information for the target system written in sector 1 of track 0 of the Read Only Zone 11. The IPL record is used to load the necessary files on the main memory device. Upon completion of step SB8, the process terminates.

(SB9) A predetermined message such as "No system files" is outputted to a console display. Upon completion of step SB9, the process terminates.

Thus, after the storage medium 10 is initialized, (Refer to the flowchart shown as FIG. 3.) by referring to the file management information 12a created in the Rewritable Zone 12 by the initialization, the pointer to the IPL record written in the Rewritable Zone 12 is obtained. The IPL record enables the system program to be loaded into the main memory device and the target system to be booted up.

Even when the file management information 12a is written in the Rewritable Zone 12 but the IPL record in not written therein, (when the Read Only Zone 11 registers only an OS but not its target system,) the IPL record corresponding to the OS written in the Read Only Zone 11 enables the system program to be loaded into the main memory device and the target system to be booted up.

Next, the input/output operation to/from the storage medium 10 by the file management system for the target system thus booted up is described.

File Creation

A directory entry for a newly created file is created in file management information 12a (directory) in the Rewritable Zone 12. The region of the newly created file is assigned by referring to the file management information 12a (file allocation table).

Record Addition to the File

By referring to the file management information 12a (file allocation table) in the Rewritable Zone 12, the region necessary for writing an additional record is assigned in the Rewritable Zone 12, and the additional record is written into the assigned region.

File Renaming and Attribute Change

The file name and attribute of the directory entry for a renamed file or a file whose attribute is changed of the file management information 12a (directory) in the Rewritable Zone 12 is rewritten.

File Data Updation

[1] By referring to the file management information 12a in the Rewritable Zone 12, the position (sector) on the storage medium 10 on the updated record is obtained.

[2] The specified data are written in the above obtained sectors. At this time, no distinction is made as to whether or not the above sector is in the Read Only Zone 11. When data are written into a sector in the Read Only Zone 11, an error is processed by an I/O subsystem for actually inputting/outputting data to/from a file being called upon by the file management system of the OS or by firmware of the driver for directly inputting/outputting data to/from the storage medium 10.

[3] When the sector to which data are written is in the Read Only Zone 11, the I/O subsystem ordinarily returns a write error. In this case, the file management system registers the sector as unusable in the file management information 12a (file allocation table). Then, by referring to the file management information 12a (file allocation table), an empty sector in the Rewritable Zone 12 is obtained, and the above designated data are written into the empty sector. (At this time, the sector of the Read Only Zone 11 registered as unusable is no longer used in the following region assignment.)

Incidentally, when the Read Only Zone 11 has a sector on which data are to be written, the I/O subsystem compares the data in the sector and the data to be written in. The I/O subsystem returns a normal (no error) message to the file management system when both data are the same, and a no-writing (error) message when they are different.

On the other hand, when the sector into which the data are written is the Rewritable Zone 11, a verification is made, after the data are written into the sector.

If the compared data are the same, the written data are considered to be normal (to have no errors) and the I/O subsystem returns a normal (no error) message to the file management system.

If they are not the same, data are written until a predetermined number of times is reached and verification is repeated.

When the Read Only Zone 11 has a written sector, it is desirable that an actual program immediately performs a verification by setting the above predetermined number of times to zero (0) without writing data in the Read Only Zone 11, for improving the processing speed.

File Deletion

Figure 5:
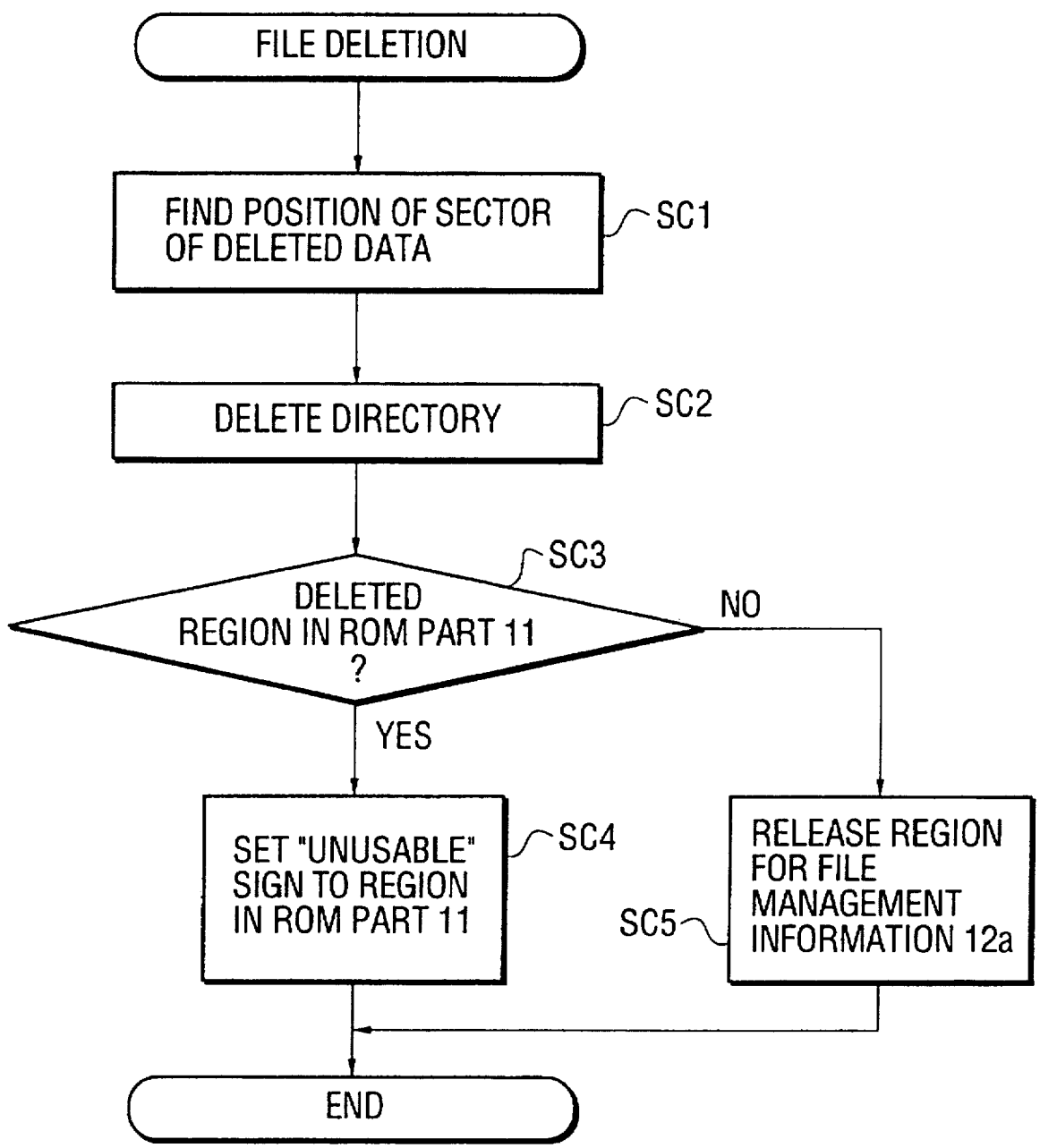
FIG. 5 is a flowchart for explaining the file deletion in the first embodiment of this invention.

FIG. 5 is a flowchart for explaining a file deletion.

Upon starting a file deletion process, step SC1 is initiated.

(SC1) The position of the sector to be deleted is obtained by the file management information 12a (directory and file allocation table) in the Rewritable Zone 12. The process then continues to step SC2.

(SC2) The file name and attribute of the directory entry of the file specified for deletion in the file management information 12a (directory) in the Rewritable Zone 12 is deleted. The process is executed by writing a delete sign at the head end of a file name. The process proceeds to step SC3.

(SC3) It is judged whether or not the region used by the deleted file is in the Read Only Zone 11. The process goes on to step SC4 on an affirmative judgment and to step SC5 on a negative judgment.

(SC4) A usable sign is written into the entry of the region (sector) in the Read Only Zone 11 used by the deleted file in the file management information 12a of the Rewritable Zone 12. Then, the process terminates.

(SC5) The entry of the region (sector) in the Read Only Zone 11 used by the deleted file in the file management information 12a (file allocation table) in the Rewritable Zone 12 is changed from "in use" to "usable", thereby releasing the above region.

Thus, although a conventional file management system puts an "usable" attribute by releasing all the regions used by the deleted file, that according to this embodiment puts an "unusable" attribute when the region used by a deleted file is in the Read Only Zone 11.

However, it is possible to use a conventional file management system "as is" without making any change.

That is, the file management information 12a (file allocation table) is rewritten such that the used region of the Read Only Zone 11 is released, as with a region of the Rewritable Zone 12, and the released region in the Read Only Zone is usable thereafter. Yet, when a request is actually made to write data into the region, as described above, the I/O subsystem immediately returns an error message to the file management system without actually writing data. This enables proper processing to be executed similarly even if the file management system puts a "usable" attribute to those sectors of the released region in the Read Only Zone 11 by rewriting the file management information 12a (file allocation table), because respective sectors of the deleted file in the Read Only Zone 12 becomes unusable for writing data in reality when the I/O subsystem commences its process.

However, since this causes a frequent write request to the Read Only Zone 11 and the access to the storage medium 10 to be inefficient, it is desirable to add the following processes to the I/O subsystem.

That is, at an appropriate timing [e.g. when an access is made to the file management information 12a (file allocation table) or when desired data are written], the file allocation table is examined for the control data for respective sectors in the Read Only Zone 11. When the control data are released (set as "usable"), they are rewritten to "unusable". On the other hand, if the control data, which are pieces of the file management information 12a provided for respective sectors in a one-by-one relation, for the sector in the Read Only Zone 11 to which data are written have already been changed to "unusable", the file management system is notified immediately of the fact that "the storage medium 10 is exchanged", for example.

This causes the file management system to judge that the internally retained write data are invalid. The notification is made in response to a request from the file management system. This allows the data writing to the sector in the Read Only Zone 11 to be aborted more frequently and the access to the storage medium 10 to be made more efficiently.

Figure 6:
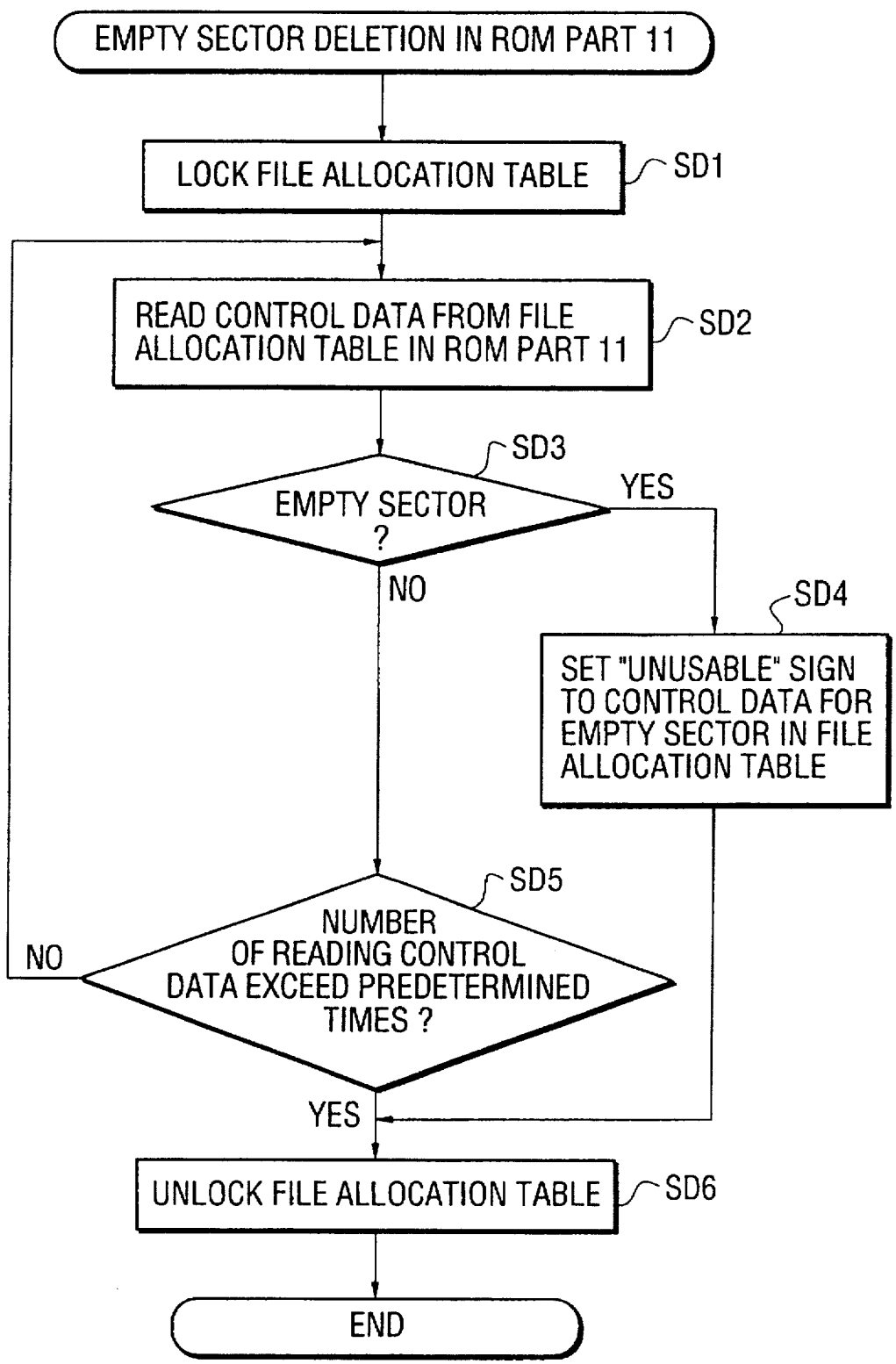
FIG. 6 is a timing chart for explaining the process of setting the control data in an empty sector of the Read Only Zone 11 to the "unusable" status at a predetermined timing.

FIG. 6 is a flowchart showing an example of the process in which the I/O subsystem makes the released sector (empty sector) in the Read Only Zone 11 to "unusable". That is, FIG. 6 shows a process of changing the control data for an empty sector of the Read Only Zone 11 in the file allocation table from "usable" to "unusable".

Upon the deletion of an empty sector in the Read Only Zone 11, the process starts.

(SD1) In FIG. 6, the I/O subsystem locks an file allocation table for exclusively using it.

(SD2) The control data for respective sectors of the Read Only Zone 11 are read from the file allocation table in a predetermined sequence.

(SD3) It is judged whether or not the sectors corresponding to the control data are empty by detecting whether or not the read control data are "usable". If the judgment is affirmative the process skips to step SD5, if negative the process continues to step SD4.

(SD4) The control data for the empty sector are made " unusable" in the file allocation table, and the process leads to step SD6.

(SD5) It is judged whether or not the control data are read by the predetermined number of times. If the judgment is affirmative the process continues to step SD6, if negative the process reverts to step SD2.

(SD6) The file allocation table is unlocked. Then, the process terminates.

The reason why the number of reading control data in the Read Only Zone 11 from the file allocation table is limited to within a predetermined number of times is to limit an overhead of the system.

Second Embodiment

This embodiment shows a case where management information specific to the storage medium 10 is prepared without having the Read Only Zone 11 store the management information for respective target systems as in the first embodiment of this embodiment.

In this case, the management information as shown in Table 3 below is written in the Read Only Zone 11 on manufacture of the storage medium 10.

TABLE 3

TRACK 0
Sector 1
bytes 1–8: format identification
bytes 9–16: empty
bytes 17–32: format information of storage medium 10
bytes 33–48: name (or ID) of target system 1
bytes 49–64: name (or ID) of target system 2
bytes 65–80: name (or ID) of target system 3
....continue until target system 29....
bytes 497–512: name (or ID) of target system 30
Sector 2
User definition
Sectors 3–8
Bit maps showing whether respective tracks belong to
the Read Only Zone 11 or the Rewritable Zone 12
Sector 9
bytes 1–48: information on file 1 written in the
Read Only Zone 11
bytes 49–96: information on file 2 written in the
Read Only Zone 11
....continue until file 9....
bytes 433–480: information on file 10 written in the
Read Only Zone 11
Sectors 10–24 repetition of sector 9
Sector 25
bytes 1–48: information on file 161 written in the
Read Only Zone 11
bytes 49–96: information on file 162 written in the
Read Only Zone 11
....continue until file 169....
bytes 433–480: information on file 170 written in the
Read Only Zone 11
TRACK 1
Sector 1
bytes 1–48: information on file 171 written in the
Read Only Zone 11
bytes 49–96: information on file 172 written in the
Read Only Zone 11
....continue until file 179....
bytes 433–480: information on file 180 written in the
Read Only Zone 11
Sectors 2–25
File information writing is repeated until the
file number reaches what is specified by the format
information of the storage medium 10 written in bytes
17 through 32 in sector 1 of track 0, as described
later.
TRACK 2
If and when necessary, storage of file information similar to that stored in track 1 is repeated.

As shown in Table 3, sector 1 of track 0 records the format identification, the format information of the storage medium 10 and the names (or IDs) of target systems 1 through 14.

The above format identifications identify the data format system for the storage medium 10.

The format information structure of the storage medium 10 is shown in Table 4 below.

TABLE 4

(TRACK 0, Sector 1 only)
byte 17: sectors/track number
bytes 18–19: total cylinder number
byte 20: side number
bytes 21–22: sector length
bytes 23–24: alternate track number
bytes 25–26: track number in the Rewritable Zone 12 to which file management information 12a for storage medium 10 is written (ordinarily the first region of the Rewritable Zone 12)
bytes 27–28: the number of files written in the Read Only Zone 11
bytes 29–32: undefined That is, the format information of the storage medium 10 in the second embodiment is very similar to that in the first embodiment. The only differences are that bytes 27 and 28 in sector 1 of track 0 record the number of files(, which store programs used by desired operating systems) written into the Read Only Zone 11, and the sequence of elements of the format information of the storage medium 10.

Bytes 33 through 512 in sector 1 of track 0 record in 4-byte units the names (or IDs) of the thirty (30) target systems from target system 1 through target system 30.

Then, sector 2 records various pieces of information defined by the user.

Sectors 3 through 8 record a bit map giving information as to whether or not each and every track in the storage medium 10 belongs to the Read Only Zone 11 or the Rewritable Zone 12.

In addition, sector 9 of track 0 and thereafter record the information of respective files whose number is specified in bytes 27 and 28 in sector 1 of track 0.

Here, table 5 shows the structure of information of file n (n=1, 2, . . . ), which is one of the above files.

TABLE 5 bytes 1–30: format name
bytes 31–32: file group number
bytes 33–36: bit map corresponding to the object system specified by the file
bytes 37–40: bit map showing the file attribute
bytes 41–44: starting position where file is written (side, track and sector)
bytes 45–48: ending position where file is written (side, track and sector)

Respective ones of bytes 1 through 48 in table 5 indicate the relative byte positions of information elements in file n.

The content of the information in the above file n (n=1, 2, . . . ) is explained, next.

File Names

Specific file names each comprising a maximum of thirty (30) bytes of alphanumerics, etc.

File Group Names

In the second embodiment, the plural files are grouped to be managed. The group number to which file n (n=1, 2, . . . ) belongs to.

Bit Maps of the Object System Specified by the Files

Not all target systems recorded in bytes 33 through. 512 in sector 1 of track 0 use the same file stored in the Read Only Zone 11. There are times when programs different for respective target systems need to be prepared even when those programs execute the same logic.

In these cases, the distinction between the programs for two (2) different target systems by their file names is not desirable from a management perspective, because the command input operations do change with different models. Thus, the file names are kept the same. It is information for using a file through selection according to the operating models. Respective bits in the bit maps correspond sequentially to target system 1 through target system 30 recorded in bytes 33 through 512 in sector 1 of track 0, and flags having a value "0" (for use) or "1" (not for use) are provided for respective bits to indicate whether or not the files are used for the target system.

File Attributes (Bit Maps)

Bit maps show the attributes of file n (n=1, 2, . . . ) in a bit map form. Respective bits in bit maps correspond sequentially to the directory, the text file, the executable format file, the read-only file, the system file and so forth.

Starting Position of a Written File

The starting position of the region for storing the file is indicated by the side [one (1) byte], the track [two (2) bytes] and the sector [one (1) byte].

Ending Position of a Written File

The ending position of the region for storing the file is indicated by the side [one (1) byte], the track [two (2) bytes] and the sector [one (1) byte].

Next, the methods of using storage medium 10 in the second embodiment configured above are explained.

Initialization of Storage Medium 10

Since the initialization process in the second embodiment is very similar to that in the first embodiment, it is only briefly explained, here.

The format identification is read out from bytes 1 through 8 in sector 1 of track 0 in the Read Only Zone 11. Then, it is judged from the format identification whether or not the data format system of the storage medium 10 is processable by the computer model.

If it is not judged that the data format system is processable, the process immediately terminates by outputting a predetermined message. If it is judged that the data format system is processable, it is further judged whether or not the storage medium 10 is already initialized. This judgment is made by detecting whether or not the file management information 12a is already created in the Rewritable Zone 12.

If it is detected that the storage medium 10 is already initialized, since the user again initializes the storage medium 10, a process is such that the content of the file management information 12a created in the Rewritable Zone 12 is displayed, thereby notifying the user.

Next, a target system to be formatted (an identification set by the combination of an OS and a model) is searched in byte 33 and thereafter of sector 1.

When a target system is found, the bit maps for the target system are created. The bit maps correspond to the bit maps written in bytes 33 through 36 in the file n (n=1, 2, . . . ), in which only the flags for the bits corresponding to the target system has value "1" indicating "for use".

After a prototype of the file management information 12a is created according to the format information (in bytes 17 through 32 of sector 1) of the storage medium 10, the number of files n written in the Read Only Zone 11 is obtained from the format information of the storage medium 10.

A logical operation is performed such that the logical product between the flag values of the earlier created bit maps and those of the bit maps (Refer to table 4.) corresponding to the target system in the information of all n (n=1, 2, . . . ) files written in sector 9 and thereafter. All files used by the target system are found, and the file management information 12a (directory and file allocation table) for managing the found files to be used is created in the Rewritable Zone 12.

Next, "not for use" is registered to the control data, if any, to which "not in use" is registered. Control data in the file management information 12a correspond to respective sectors of the Read Only Zone 11.

Then, the file management information 12a created as above is written into a predetermined region in the Rewritable Zone 12.

Further, when the target system is capable of receiving an IPL record from the storage medium 10, the IPL record prepared in some other media (e.g. a magnetic tape or a floppy disk) is written into the predetermined region in the Rewritable Zone 12.

Through those processes, the file management information 12a for managing files written in the Read Only Zone 11 necessitated by the target system is written in the Rewritable Zone 12 of the storage medium 10. The IPL record corresponding to the target system is also written.

IPL Record From the Storage Medium 10

The IPL processing is similar to that from the storage medium 10 in the first embodiment of this invention except that the IPL record is not booted into the main memory device when the IPL record is not written in the Rewritable Zone 12. Hence, a detailed explanation is omitted.

The file managing processes, such as the file creation, the data addition to the files, the file renaming, the attribute revision, the file updating and the file deletion, are similar to those in the first embodiment of this invention. Hence their detailed explanations are also omitted.

Thus, various file management systems can be configured by using a single storage medium 10.

Since the information recorded in the Read Only Zone 11 is not erased, even if all the information written in the Rewritable Zone 12 is erased, the second embodiment, as with the first embodiment, enables a desired file management system to be rebuilt immediately.

The second embodiment of this invention causes the I/O system to return data of the sector, if they are the same as the data to be written, and only when the data of the sector are the same as the write data. In order to use regions in the Read Only Zone 11 effectively, even when the file management system and the I/O subsystem execute the processes shown in the flowchart of FIG. 7 and the data in the sector of the writing target in the Read Only Zone 11 which the I/O subsystem received from the file management system are not the same as the data to be written, an error message is not issued immediately. Instead, the sector in the Read Only Zone 11 where data the same as the data to be written are written is found. Thus, virtual data are written into the sector. A performance of such a process causes the data region of a desired file to be arranged in both sectors in the Rewritable Zone 11 and the Read Only Zone 12, enabling the data capacity of the Read Only Zone 11 to be utilized effectively. This allows the storage medium 10 to have a larger data capacity capable of being used as a file creation region.

Figure 7:
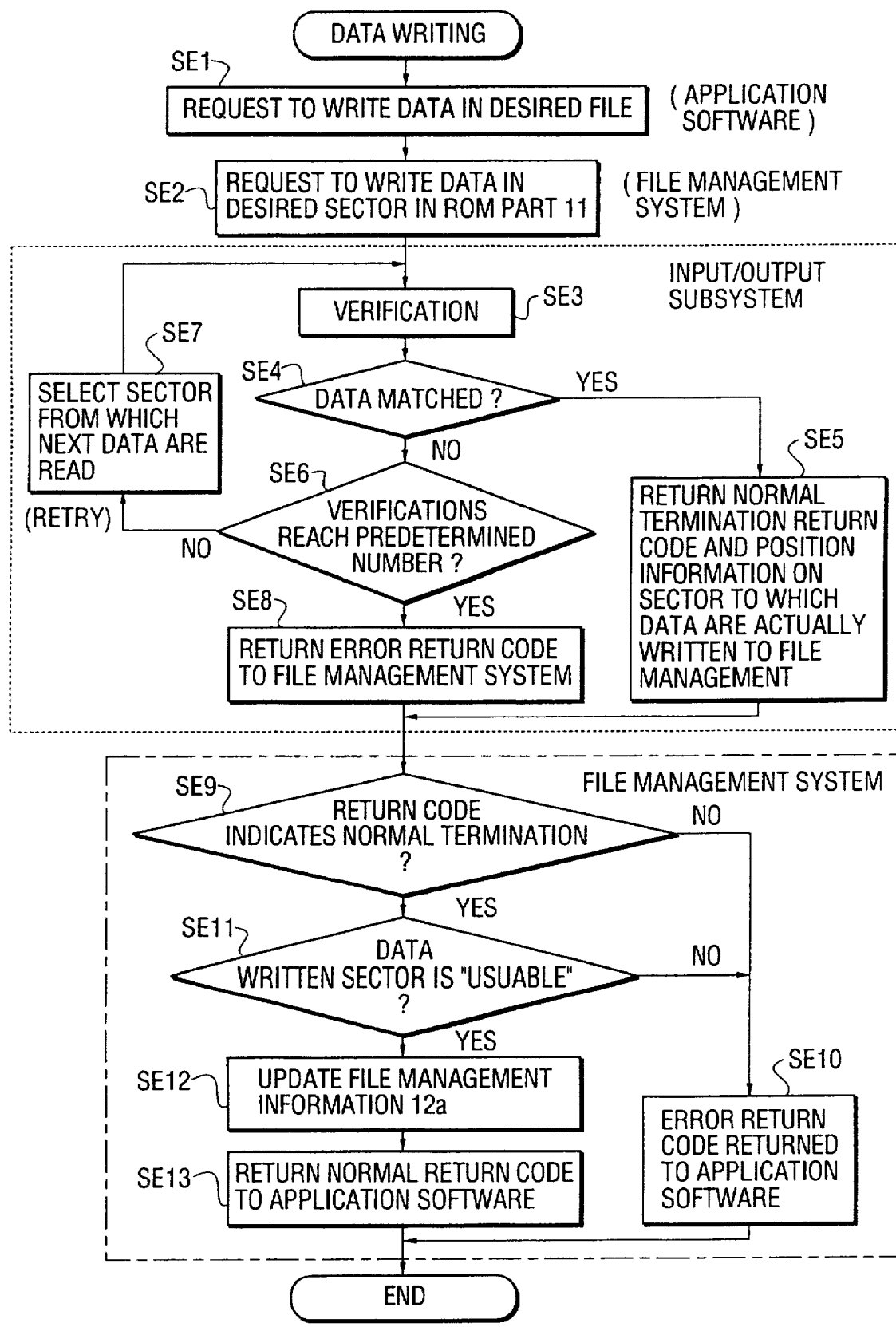
FIG. 7 is a flowchart for explaining the process when data are requested to be written into the Read Only Zone 11.

FIG. 7 is a flowchart for explaining the processes after a request is made to write data.

(SE1) An application software side issues a request for writing data in a certain file.

(SE2) The file management refers to a file allocation table and finds a "usable" sector, and transmits to an I/O subsystem the data writing request whose parameters are the sector and the data to be written requested by the application software side.

The following explanation assumes that the sector belongs to the Read Only Zone 11.

(SE3) On receiving the data writing request from the file management system, the I/O subsystem reads, for verification, data from the sector in the Read Only Zone 11 which the writing request designates.

(SE4) The I/O subsystem judges whether or not the data read from the sector match the data received from the file management system. If the judgment is affirmative the process proceeds to step SE5, if negative it skips to step SE6.

(SE5) The I/O subsystem immediately returns a return code representing a normal termination and the position information of the sector in the Read Only Zone 11 which the writing request designates. The process then continues to step SE9.

The above steps are similar to those performed in the second embodiment.

(SE6) The I/O subsystem judges whether or not a predetermined number of reading data for verification has been reached. If the judgment is affirmative the process jumps to step SE8, and if negative it goes on to step SE7.

(SE7) The I/O subsystem selects data at random or in a predetermined sequence in a sector other than the above designated sector in the Read Only Zone 11. The process then reverts to step SE3.

(SE8) The I/O subsystem returns the error return code to the file management system. The process then continues to step SE9.

(SE9) The I/O subsystem re-invokes the file management system, which judges whether or not the return code received from the I/O subsystem indicates a normal termination or an abnormal termination. If the judgment is affirmative the process jumps to step SE11, if negative it continues to step SE10.

(SE10) The I/O subsystem returns the error return code to the application software side. Then, the process terminates.

(SE11) It is judged whether or not the control data, in the file allocation table, for the sector to which data are written are set to the "usable" state. If the judgment is affirmative the process continues to step SE12, if negative the process merges to step SE10.

(SE12) The file management information 12a is updated in a predetermined manner. For example, according to a data updation or a data deletion, the sector which the data writing designates is registered in the file requested by the application software side, the control data for the data written sector is changed from "usable" to "in use", or the file size in a directory is updated. The process continues to step SE13.

(SE13) The normal termination code is returned to the application software side. Then the process terminates.

These processes enable a desired sector in the Read Only Zone 11 to be used as a desired file data region. Also, by setting to an appropriate value the threshold value for limiting the number of executions of step SE3 which the I/O subsystem performs each time a data writing request is made to the Read Only Zone 11, the overhead caused by searching the target sectors can be reduced to a low value. Since the I/O subsystem searches the target sector only by verifying the data to be written in without actually writing them, the target sector is searched at a high speed.

As explained above, since this invention causes the same single file allocation table to manage the usage status of respective sectors without ever distinguishing whether respective sectors belong to the Read Only Zone 11 or the Rewritable Zone 12, conventional file management information (such as a file allocation table and a directory) used by a conventional file management system is used "as is" for file management.

Although the first and second embodiments assume separate management of the usage status of the regions in the storage medium 10 in units of sectors, which are a physical input/output unit, this invention can be structured such that the usage status is managed in cluster units, which are the minimum units for data region assignment for a file structured by a desired number of successive sectors. Even when such a management is made, the file management information for a conventional file management system in which data regions are configured in cluster units can be used "as is".

Also, the Read Only Zone can be configured to store files, such as those related to text files and graphic data files, other than those configuring the OS.

Here, although the embodiments of this invention assume the division of an storage medium into two (2) parts comprising a Read Only Zone and a Rewritable Zone, the arrangement of the Read Only Zone and the Rewritable Zone can be varied such as in a staggered configuration.

As explained in detail above, this invention enables file management information created in the Rewritable Zone to manage files created in a Rewritable Zone and a Read Only Zone, thereby enabling a single storage medium to be similarly managed as by a conventional file management system.

What is claimed is:

1. A file management system for a partially rewritable single storage medium including both a Rewritable Zone and an unrewritable Read Only Zone, said Read Only Zone including a desired number of files and medium management information, said medium management information including pieces of management information for respective said files, said files and medium management information initially being written into said Read Only Zone of said partially rewritable single storage medium during a manufacturing of said partially rewritable single storage medium, said file management system comprising:

reading means for reading said medium management information written into said Read Only Zone upon commencing the use of said storage medium; and creating means for creating in said Rewritable Zone file management information based on one of a model of hardware and an operating system necessary for using said storage medium, from said medium management information read by said reading means and contents of said Read Only Zone, upon the commencing of the use of said storage medium.

2. The file management system for a partially rewritable storage medium according to claim 1, further comprising data writing means for comparing a data write request to write request data in a predetermined region of said Read Only Zone with data already written in another region in said Read Only Zone by searching for said another region having the same data contents as the request data, and for determining the request data to have the same contents as the data already written in said another region based on said comparison.

3. The file management system for a partially rewritable storage medium according to claim 1, further comprising data writing means for comparing a data write request to write request data in a predetermined region of said Read Only Zone with data already written in another region in said Read Only Zone by searching for said another region having the same data contents as the request data, and for determining the request data not to have the same contents as the data already written in said another region based on said comparison.

4. The file management system for a partially rewritable storage medium according to claim 3, wherein:

said data writing means further limits the number of reading data from regions to a predetermined number of times, when said data writing means searches for the region in the Read Only Zone where the same data as the data requested to be written are already written.

5. The file management system for a partially rewritable storage medium according to claim 1, further comprising a region supervising means, for use in managing region management information in file management information created in said Rewritable Zone, for examining, at a predetermined timing, control data for a region to be managed in said region management information in the Read Only Zone, and for updating said control data for said region, such that said region becomes unusable, when said control data assigns said region as a usable region.

6. The file management system for a partially rewritable storage medium according to claim 2, further comprising a region supervising means, for use in managing region management information in file management information created in said Rewritable Zone, for examining, at a predetermined timing, control data for a region to be managed in said region management information in the Read Only Zone, and for updating said control data for said region, such that said region becomes unusable, when said control data assigns said region as a usable region.

7. The file management system for a partially rewritable storage medium according to claim 3, further comprising a region supervising means, for use in managing region management information in file management information created in said Rewritable Zone, for examining, at a predetermined timing, control data for a region to be managed in said region management information in the Read Only Zone, and for updating said control data for said region, such that said region becomes unusable, when said control data assigns said region as a usable region.

8. The file management system for a partially rewritable storage medium according to claim 4, further comprising a region supervising means, for use in managing region management information in file management information created in said Rewritable Zone, for examining, at a predetermined timing, control data for a region to be managed in said region management information in the Read Only Zone, and for updating said control data for said region, such that said region becomes unusable, when said control data assigns said region as a usable region.

9. The file management system for a partially rewritable storage medium according to claim 1, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

10. The file management system for a partially rewritable storage medium according to claim 2, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

11. The file management system for a partially rewritable storage medium according to claim 3, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

12. The file management system for a partially rewritable storage medium according to claim 4, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

13. The file management system for a partially rewritable storage medium according to claim 5, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

14. The file management system for a partially rewritable storage medium according to claim 6, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

15. The file management system for a partially rewritable storage medium according to claim 7, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

16. The file management system for a partially rewritable storage medium according to claim 8, wherein:

said desired number of files in said Read Only Zone each store program data and file management information for a predetermined number of target systems defined by the combination of a model and an operating system, and upon the commencing of the use of said storage medium, said reading means selects one of the file management information based on the model and the operating system under which the storage medium is being used, and then said creating means copies said selected file management information into said Rewritable Zone.

17. The file management system for a partially rewritable storage medium according to claim 9, wherein:

said pieces of management information for said respective files created in said Read Only Zone include data specifying which programs respectively stored in said files are used for the operating system of a target system.

18. The file management system for a partially rewritable storage medium according to claim 10, wherein:

said pieces of management information for said respective files created in said Read Only Zone include data specifying which programs respectively stored in said files are used for the operating system of a target system.

19. The file management system for a partially rewritable storage medium according to claim 11, wherein:

said pieces of management information for said respective files created in said Read Only Zone include data specifying which programs respectively stored in said files are used for the Operating system of a target system.

20. The file management system for a partially rewritable storage medium according to claim 12, wherein:

said pieces of management information for said respective files created in said Read Only Zone include data specifying which programs respectively stored in said files are used for the operating system of a target system.

21. The file management system for a partially rewritable storage medium according to claim 13, wherein:

said pieces of management information for said respective files created in said Read Only Zone include data specifying which programs respectively stored in said files are used for the operating system of a target system.

22. The file management system for a partially rewritable storage medium according to claim 14, wherein:

said pieces of management information for said respective files created in said Read Only Zone include data specifying which programs respectively stored in said files are used for the operating system of a target system.

23. The file management system for a partially rewritable storage medium according to claim 15, wherein:

said pieces of management information for said respective files created in said Read Only Zone include data specifying which programs respectively stored in said files are used for the operating system of a target system.

24. The file management system for a partially rewritable storage medium according to claim 16, wherein:

said pieces of management information for said respective files created in said Read Only Zone include data specifying which programs respectively stored in said files are used for the operating system of a target system.

25. The file management system for a partially rewritable storage medium according to claim 17, wherein:

said desired number of files in said Read Only Zone store data indicating an operating system for a target system and said data includes bit maps created individually for said respective files on a bit-by-bit basis.

26. The file management system for a partially rewritable storage medium according to claim 18, wherein:

said desired number of files in said Read Only Zone store data indicating an operating system for a target system and said data includes bit maps created individually for said respective files on a bit-by-bit basis.

27. The file management system for a partially rewritable storage medium according to claim 19, wherein:

said desired number of files in said Read Only Zone store data indicating an operating system for a target system and said data includes bit maps created individually for said respective files on a bit-by-bit basis.

28. The file management system for a partially rewritable storage medium according to claim 20, wherein:

said desired number of files in said Read Only Zone store data indicating an operating system for a target system and said data includes bit maps created individually for said respective files on a bit-by-bit basis.

29. The file management system for a partially rewritable storage medium according to claim 21, wherein:

said desired number of files in said Read Only Zone store data indicating an operating system for a target system and said data includes bit maps created individually for said respective files on a bit-by-bit basis.

30. The file management system for a partially rewritable storage medium according to claim 22, wherein:

said desired number of files in said Read Only Zone store data indicating an operating system for a target system and said data includes bit maps created individually for said respective files on a bit-by-bit basis.

31. The file management system for a partially rewritable storage medium according to claim 23, wherein:

said desired number of files in said Read Only Zone store data indicating an operating system for a target system and said data includes bit maps created individually for said respective files on a bit-by-bit basis.

32. The file management system for a partially rewritable storage medium according to claim 24, wherein:

said desired number of files in said Read Only Zone store data indicating an operating system for a target system and said data includes bit maps created individually for said respective files on a bit-by-bit basis.

* * * * *

UNITED STATES PATENT AND TRADEMARK OFFICE
CERTIFICATE OF CORRECTION

PATENT NO. : 5,537,636
DATED : July 16, 1996
INVENTOR(S) : UCHIDA ET AL.

It is certified that error appears in the above-indentified patent and that said Letters Patent is hereby corrected as shown below:

<u>TITLE PAGE</u>: Item [63]:

Under FOREIGN PATENT DOCUMENTS:

Line 2,   change "032840" to --0328240--.

<u>IN THE ABSTRACT</u>:

Line 2,   change "increases" to --includes--.

Column 1, line 35, delete "-";
Column 5, line 34, delete "." (period) after "the";
Column 7, line 20, change "system I" to --system II--;
Column 9, line 50, "(SA9)" begins a new paragraph;
Column 11, line 5, delete "," (comma) after "1" and close gap;

Signed and Sealed this

Third Day of December, 1996

Attest:

BRUCE LEHMAN

Attesting Officer    Commissioner of Patents and Trademarks